United States Patent
Delbridge

(10) Patent No.: US 7,318,612 B2
(45) Date of Patent: Jan. 15, 2008

(54) GRAVITY ACTUATED RETRIEVAL DEVICE

(76) Inventor: Wallace K. Delbridge, 530 Jacob Buck Pond Rd., Bucksport, ME (US) 04416

( * ) Notice: Subject to any disclaimer, the term of this patent is extended or adjusted under 35 U.S.C. 154(b) by 0 days.

(21) Appl. No.: 11/139,246

(22) Filed: May 27, 2005

(65) Prior Publication Data

US 2006/0267361 A1    Nov. 30, 2006

(51) Int. Cl.
*B66C 1/42* (2006.01)
(52) U.S. Cl. .................. 294/104; 294/1.1; 294/111
(58) Field of Classification Search .............. 294/11, 294/17, 82.1, 82.17, 82.19, 104, 103.1, 1.1, 294/111
See application file for complete search history.

(56) References Cited

U.S. PATENT DOCUMENTS

| | | | | |
|---|---|---|---|---|
| 297,393 A | * | 4/1884 | Hatfield | 294/104 |
| 976,789 A | * | 11/1910 | Drubko | 43/89 |
| 1,493,114 A | * | 5/1924 | Hodge et al. | 294/17 |
| 3,051,521 A | * | 8/1962 | Skowron | 294/110.1 |
| 3,414,315 A | * | 12/1968 | O'Quinn | 294/104 |
| 4,637,769 A | * | 1/1987 | Thorndike | 294/104 |
| 4,729,711 A | * | 3/1988 | Holopainen | 294/104 |
| 4,938,517 A | * | 7/1990 | Langloy | 294/101 |
| 5,017,080 A | * | 5/1991 | Thorndike et al. | 294/104 |
| 5,290,013 A | * | 3/1994 | Dearman | 294/53.5 |
| 6,361,094 B1 | | 3/2002 | Pelley | |

* cited by examiner

*Primary Examiner*—Saul Rodriguez
*Assistant Examiner*—Paul T Chin
(74) *Attorney, Agent, or Firm*—Patricia M. Mathers

(57) ABSTRACT

Gravity-actuated device for retrieving various types of objects from various ground surfaces. The device has a single retrieval arm pivotably mounted on a slender frame. Gripping elements on the end of the retrieval arm allow the operator to grip a variety of objects, including soft flexible objects, such as a glove, rigid slender objects, such as an arrow, or objects having a loop or strap, such as a thermos bottle. The device is suspended from above to retrieve the object and collapses to a slender compact configuration when not in use.

17 Claims, 5 Drawing Sheets

GRAVITY ACTUATED RETRIEVAL DEVICE

BACKGROUND INFORMATION

1. Field of the Invention

The invention relates to the field of devices for retrieving or grabbing objects. More particularly, the invention relates to a device for retrieving objects from above that have fallen from an above-ground perch onto the ground below.

2. Description of the Prior Art

Hunters often position themselves in hunting blinds or tree stands, because this allows the hunter to clearly see a hunting ground, without in turn being seen by the hunted game. The tree stands frequently are rough built wood structures built on the edge of fields, high off the ground so as to provide a good view over a distance. The platforms of the stands are accessible via a ladder. Hunters climb into the tree stands with their gear and ensconce themselves. Their gear includes extra clothing, weapons and ammunition, accessories, such as animal calling devices and binoculars, and food. Because game spook easily, hunters generally try to remain as quiet as possible and move minimally and slowly. If a hunter drops an item from the tree stand onto the ground below, he or she must climb down from the tree stand to retrieve it. This activity risks frightening the game. As a result, a dropped object is often not retrieved. This is a problem if the dropped object is a necessary or useful item, such as a hat or glove, a thermos bottle, or an arrow.

For these reasons, it is desirable to have a device for retrieving an object from above. Several such devices are known. Their disadvantages are that they are bulky and not easily carried in a backpack. One single device typically cannot accommodate a variety of objects that include large, soft objects such as a hat or jacket, long, slender objects, such as an arrow, or bulky objects with a strap or loop, such as a thermos bottle or a camera.

What is needed therefore is an object retrieval device that is light weight and small in size, adjustable, simple to use. What is further needed is such a device, that is able to retrieve a variety of types of objects and able to retrieve those objects from varying conditions of ground surface. What is yet further needed is such a device that is inexpensive to manufacture and assemble.

BRIEF SUMMARY OF THE INVENTION

The invention is a gravity-actuated object retrieval device. The device is light weight, adjustable, and easy to use and enables an operator to retrieve an object that lies a significant distance beneath the operator. The object retrieval device comprises a frame or chassis that supports a retrieval means and an actuation means, and a suspension means for maneuvering the device over the object to be retrieved and bringing the object back up to the operator. The actuation means automatically releases a trigger when the object retrieval device makes contact with the ground surface, or the object. This in turn releases the retrieval means, which captures the object. The object retrieval device is then pulled up to the operator by the suspension means.

The actuation means is a trigger that is slidably mounted over an opening in the frame. A pivot arm is mounted in the opening in the frame. A proximal end of the pivot arm is rotatably assembled in the opening and a distal end with gripping elements extends outward from the proximal end to an anterior side of the frame. The trigger and the pivot arm cooperate to provide a cocked position, in which the pivot arm is poised to clasp an object, or a closed position, in which the pivot arm is either holding a retrieved object up against the frame as the object retrieval device is being lifted up to the operator, or is held in a collapsed configuration for non-use or stowing. A biasing means biases the retrieval means toward the closed position, when the device is not cocked.

A roller bearing is attached to the proximal end of the pivot arm, as are means for locking the distal end of the pivot arm against the frame. To set the cocked position, the distal end of the pivot arm is rotated upward and away from the frame. The trigger is pulled upward by the suspension means until the roller bearing rests on the anterior side of the trigger foot. This prevents the pivot arm from rotating back into a closed position. The trigger remains in this cocked position only as long as an upward pull is exerted on it by the suspension means. Once the suspension means slackens, the trigger gravitates downward, the roller bearing rolls off the trigger, and the pivot arm is released from the cocked position.

The distal end of the pivot arm is provided with retrieval means for retrieving various types of objects, such as gripping elements or claws for grabbing soft objects, a recess for holding slender, rigid objects, and a curved shape for engaging loops. In the closed position, the gripping elements rest against the frame. Ideally, the points of the gripping elements are seated in recesses provided on the frame, to protect them against damage.

The object retrieval device according to the invention includes additional features that are optional, but provide improved function. A trigger guide aids in transferring the weight of the retrieved objects from the retrieval means to the frame itself, thereby preventing other components of the object retrieval device from bearing the weight and suffering deformation as a result. A locking means may be provided on the pivot arm and trigger to hold the distal end of the arm in a closed position. An adjustable foot may be provided in the lower end of the frame. The foot is particularly useful when using the object retrieval device to retrieve objects from a ground surface that is covered with litter, such as leaves or other soft or movable debris. The foot is slidably assembled onto the bottom of the frame to provide a height adjustable support, which allows overall the height of the object retrieval device to be adjusted to accommodate the particular size and features of the object to be retrieved, as well as type of or conditions on the ground surface.

The object retrieval device according to the invention requires no hand strength or dexterity to operate. To capture a dropped object, the object retrieval device is set in the cocked position, lowered via the suspension means to the ground in a manner such that the object to be captured is positioned in the opening between the bottom of the frame and the retrieval means. As soon as the object retrieval device sets down on the ground surface, the suspension means will slacken. Gravity then moves the trigger downward in the frame, thereby releasing the retrieval means. Force exerted by a torsion spring biases the retrieval means toward the closed position, with the ends of the retrieval means urged toward the frame. This increases the gripping force of the gripping elements on the object to be retrieved. Serrations may also be provided toward the lower, anterior end of the frame. These serrations, in conjunction with the gripping element, improve the gripping ability of the device. Lifting the device by the suspension means raises the trigger so that the locking means provided on the trigger engages with the locking means on the proximal end of the pivot arm, thus locking the retrieval means in the closed position and preventing the pivot arm from swinging open during the retrieval maneuver. The operator then recovers the object by lifting the object retrieval device along with the captured object by the suspension means.

BRIEF DESCRIPTION OF THE DRAWINGS

The present invention is described with reference to the accompanying drawings. In the drawings, like reference numbers indicate identical or functionally similar elements. The drawings are not drawn to scale.

FIG. 2A is a cross-sectional view of the preferred embodiment of the frame.

FIG. 2B is a partial front elevational view of the frame of FIG. 2A, showing the opening.

DETAILED DESCRIPTION OF THE INVENTION

The present invention will now be described more fully in detail with reference to the accompanying drawings, in which the preferred embodiment of the invention is shown. This invention should not, however, be construed as limited to the embodiment set forth herein; rather, the embodiment is provided so that this disclosure will be complete and will fully convey the scope of the invention to those skilled in the art.

Figure 1:
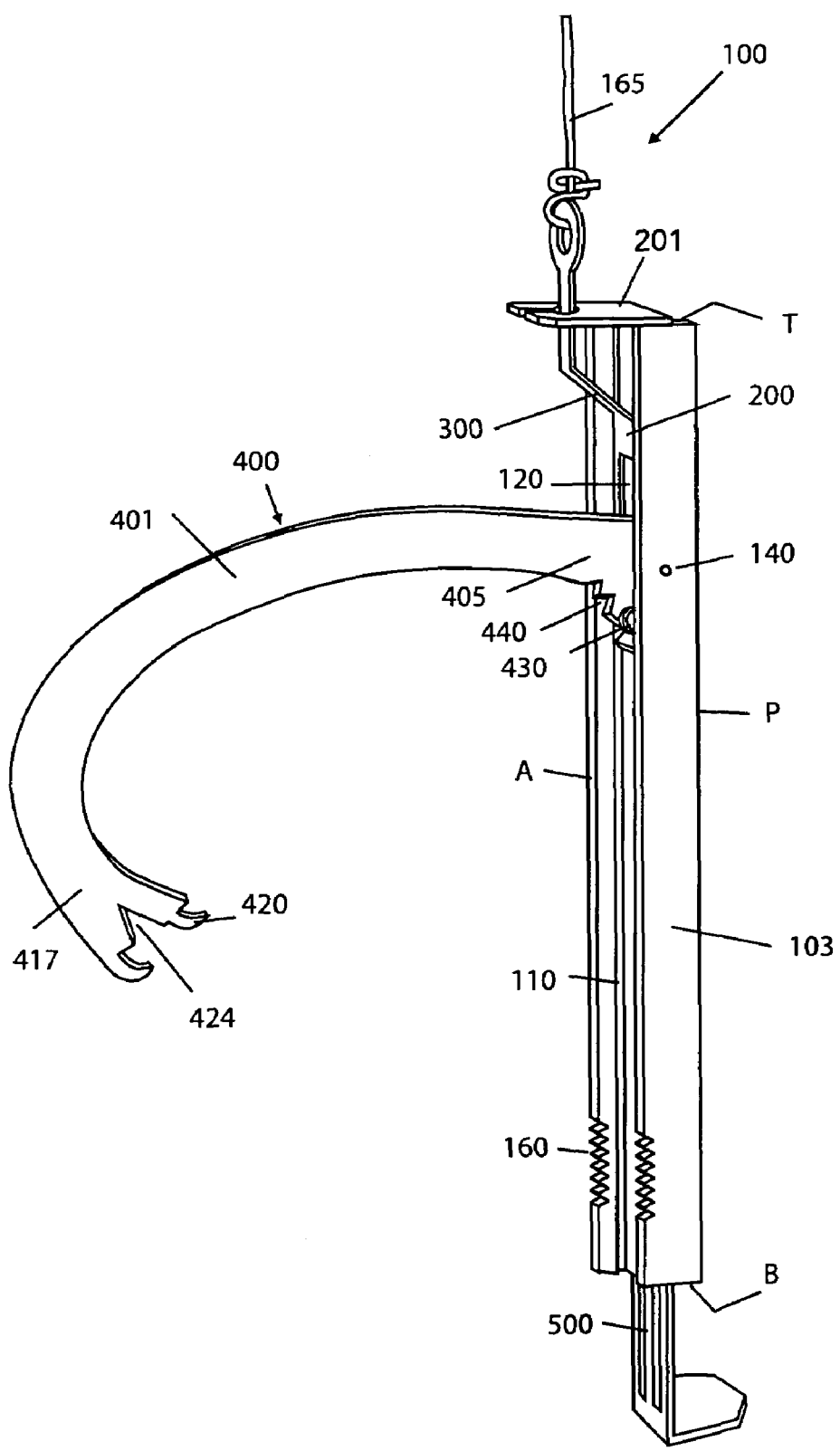
FIG. 1 is a perspective view of the object retrieval device.

FIG. 1 provides a general view of an object retrieval device 100 according to the invention. The object retrieval device 100 comprises a frame or chassis 103, a retrieval means 400, an actuation means 200, and a suspension means 165.

Figure 2:
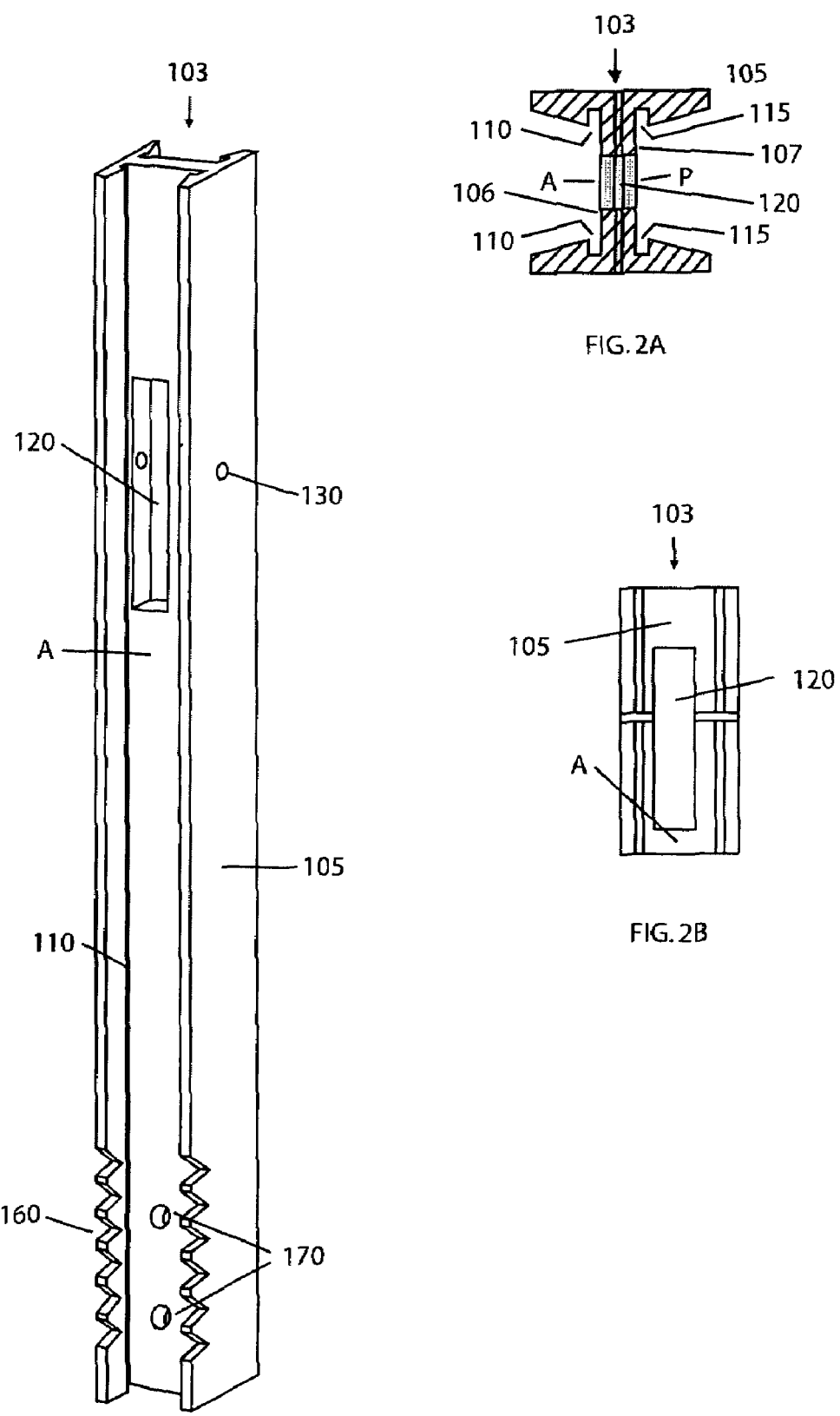
FIG. 2 is an elevational perspective view of the frame, showing the entire length of the frame and the opening in the frame.

FIGS. 2, 2A and 2B illustrate the frame 103. FIG. 2 is a perspective front elevational view that shows the frame 103, which provides means for retaining the actuation means 200 and the retrieval means 400. In the embodiment shown, the frame 103 is an elongate member 105 having a top end T, a bottom end B, an anterior side A, and a posterior side P. FIG. 2A illustrates the cross-section of a particularly suitable shape. The elongate member 105, as shown, is an I-beam structure having an anterior channel 106 with two parallel and opposing anterior grooves 110, and a posterior channel 107 with two parallel and opposing posterior grooves 115. It is understood, however, that the elongate member 105 can be of a different shape and need not be an I-beam at all. FIG. 2B illustrates a portion of the frame 103, showing a frame opening 120 that is provided for mounting the retrieval means 400. A series of serrations 160 may be provided in the anterior side A of the frame 103 near the bottom end B. One or more seating recesses or holes 170 may also be provided in the frame 103 in the vicinity of the serrations 160. The purpose of these serrations 160 and seating recesses 170 is described below.

Figure 3:
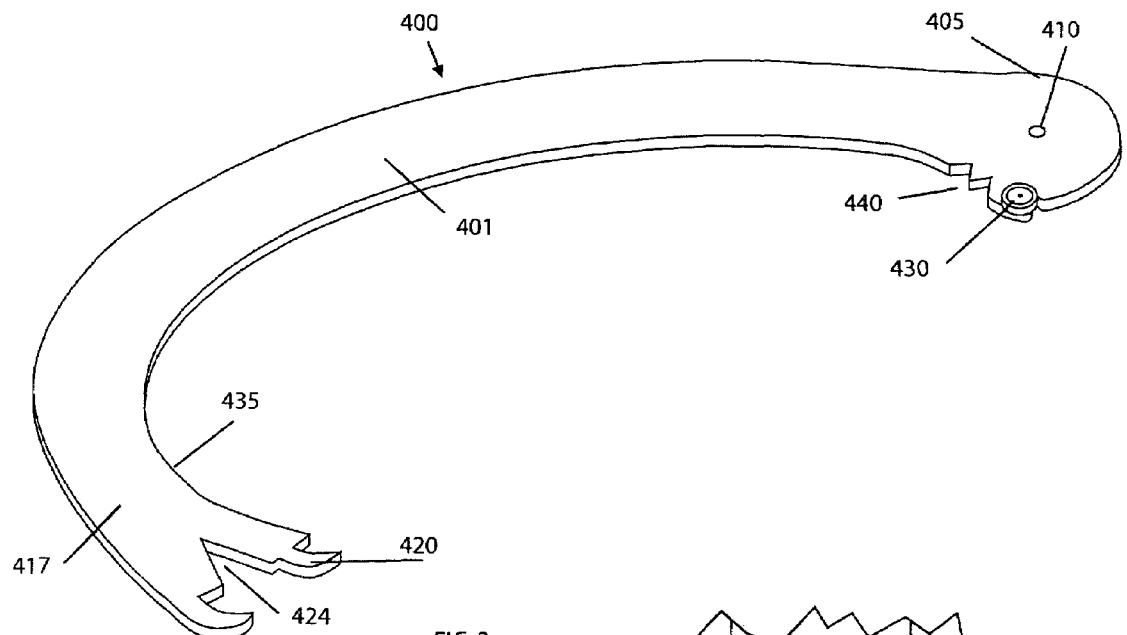
FIG. 3 illustrates the retrieval means.

FIG. 3 illustrates the retrieval means 400, which is a pivot arm 401 in the shape of an elongated "C". The pivot arm 401 has a distal end 417 and a proximal end 405 and various features that allow it to retrieve a variety of objects. In the embodiment shown, gripping elements 420 are provided at the distal end 417. These gripping elements 420 are preferably claw-like elements that are particularly well suited for grabbing soft objects, such as a hat, gloves, jacket, etc. A gripping recess 424 between the gripping elements 420 allows the retrieval means 400 to retrieve long slender objects, such as an arrow. A valley 435 in the inner curve of the pivot arm 401 allows the pivot arm 401 to scoop under and engage a loop or strap on an object. The curved sweep of the valley 435 allows the object suspended from the loop or strap to find a balanced position in the curve, so that when the object retrieval device 100 is lifted above the ground, the object will not slide around and cause a weight shift on the retrieval means 400, which could result in a shift of the pivot arm 401 to an extent that the object is dropped from the pivot arm 401. Depending on the particular envisioned use of the object retrieval device 100 according to the invention, the gripping elements 420 may be shaped differently. Serrations 160 may be provided toward the bottom end B on the anterior side A of the frame 103, as shown in FIG. 1. These serrations 160, in conjunction with the gripping element 420, improve the gripping ability of the object retrieval device 100.

Figure 3A:
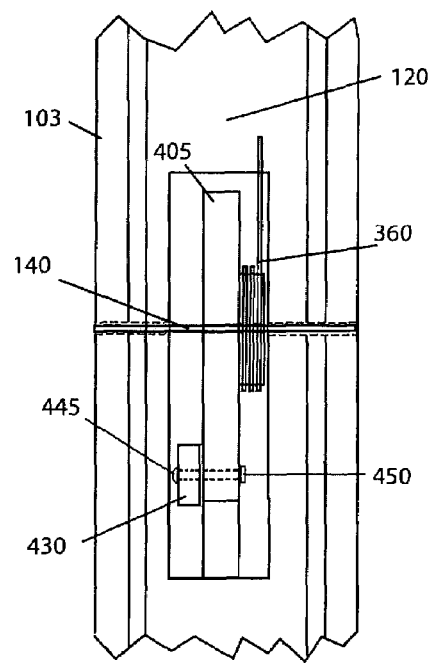
FIG. 3A illustrates an on-edge view of the base end of the retrieval means from the posterior side of the object retrieval device.

The retrieval means 400 is attached to the frame 103 of the object retrieval device 100 at its proximal end 405, as shown in FIG. 1. For this purpose, a shaft hole 410 is provided for mounting the pivot arm on a mounting shaft 140, shown below in FIGS. 3A and FIG. 6A. FIG. 3A shows an on-edge view of the proximal end 405 of the retrieval means 400. A roller bearing 430 is fixedly attached to the proximal end 405 by a fastener 445 and nut 450. A torsion spring 360 is wrapped about a spacer 355 that is mounted on the shaft 140. The spacer 355 keeps the pivot arm 401 properly aligned on the shaft 140 and the torsion spring 360 biases the pivot arm 401 to a closed position. Pivot arm teeth 440 are provided on the pivot arm 401, just anterior of the roller bearing 430. The purpose of these components will be discussed below in the discussion of operation of the object retrieval device 100.

Figure 4:
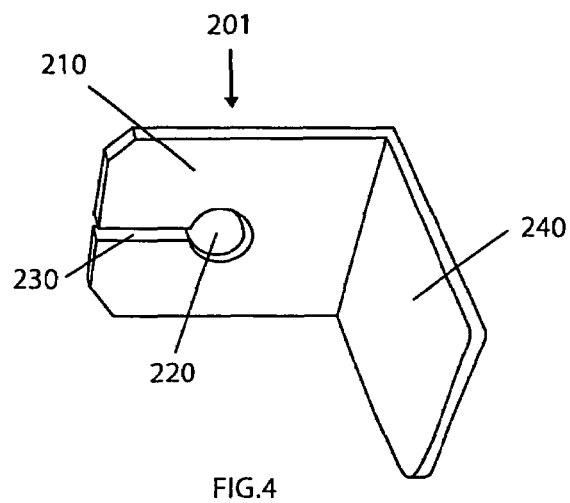
FIG. 4 illustrates the trigger guide.
Figure 5:
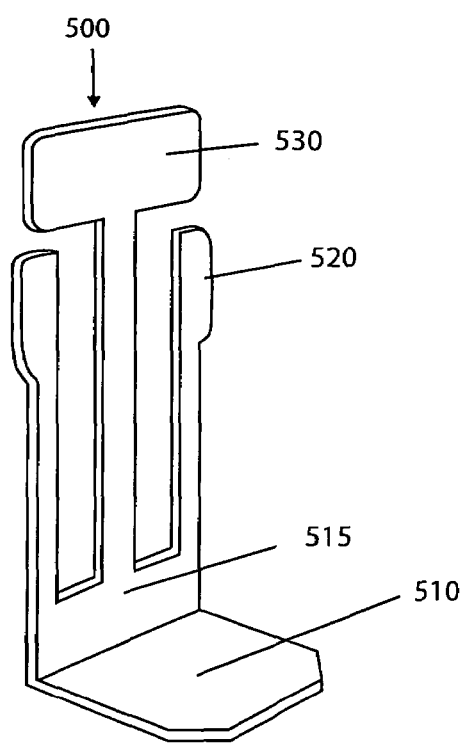
FIG. 5 illustrates the trigger.

The actuation means 200 includes a trigger guide 201, shown in FIG. 4, and a trigger 300, shown in FIG. 5. The trigger guide 201 has a guide top 210 that is cantilevered from a guide base 240. A guide aperture 220 is provided in the guide top 210 for allowing a portion of the trigger 300 to pass through, as shown in FIG. 1. In the embodiment shown, the guide top 210 has a guide slot 230 that opens into the guide aperture 220. Also, in the embodiment shown, the guide base 240 is slidably assembled in the posterior channel 107 of the frame 103 and is securely held in place, either by the friction of an interference fit or by a suitable fastening means. The trigger guide 201 may be integrated into the construction of the frame 103, rather than provided as a separate component. When the guide base 240 is assembled in the posterior groove 120, the guide top 210 is cantilevered across the top of and toward the anterior side A of the frame 103, thereby holding the guide aperture 220 on the anterior side A of object retrieval device 100. The trigger guide 201 serves as a retainer and guide for an upper end of the trigger 300.

FIG. 5 is a view of the trigger 300, which comprises a trigger loop 310, a trigger offset 320 with a trigger throat 315 therebetween, and a trigger body 335. The trigger loop 310 is dimensioned to slide through the guide slot 230 and to fit inside the guide aperture 220. The trigger body 335 is assembled in the frame 103 in the anterior channel 106 (before the retrieval means 400 is assembled). Proturberances 340 provided on the sides of the trigger body 335 slidably retain the trigger 300 in the anterior grooves 110. The trigger offset 320 is sufficient for the trigger body 335 to rest in the anterior channel 106 while the trigger throat 320 is retained in the guide aperture 220. The trigger 300 is thus able to slide up and down in the frame 103. A trigger opening 337 is provided in the trigger body 335. The dimensions of the trigger opening 337 correspond approximately to the dimensions of the frame opening 120. A trigger foot 350 extends from the trigger body 335 downward and in the anterior direction of the object retrieval device 100 when assembled. A suspension means 165, which in the preferred embodiment is a rope or a cable, is attached to the trigger loop 310. The suspension means 165 may be any other suitable means that allows the object retrieval device 100 to be suspended below the device operator.

Figure 6A:
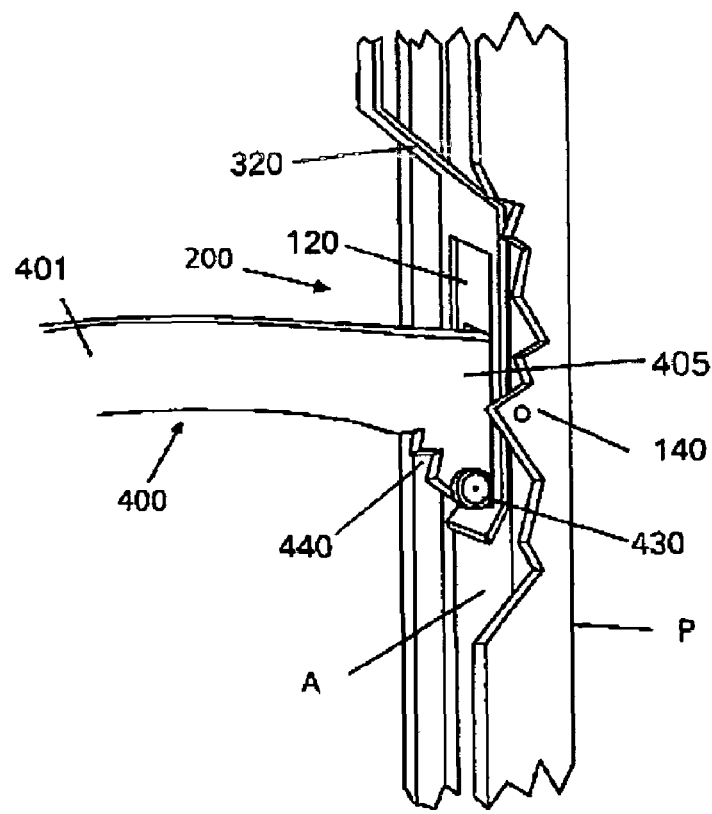
FIG. 6A shows the actuation means held in the engaged position.
Figure 6B:
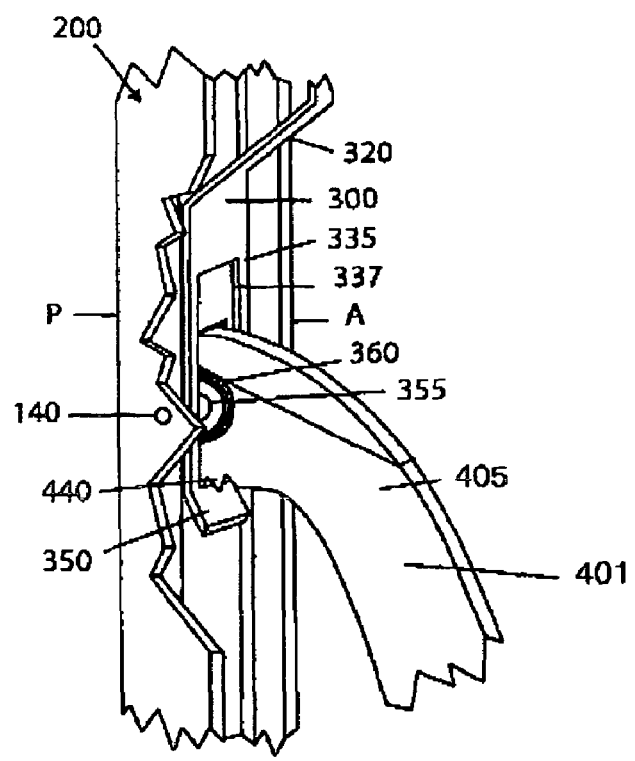
FIG. 6B shows the actuation means biased in the released position by the torsion spring.

FIGS. 6A and 6B show the retrieval means 400, the trigger 300, and the actuation means 200 assembled in the frame 103. FIG. 6A shows the retrieval means 400 in the cocked position (also shown in FIG. 1) and FIG. 6B shows it in the closed position. The proximal end 405 of the pivot arm 401 is mounted in the frame opening 120 of the frame 103 on a shaft assembly that includes the shaft 140 and one or more spacers 355. The shaft 140 is mounted in the frame 103 and inserted through the shaft hole 410 on the pivot arm 401, so that the pivot arm 401 is rotatably mounted on the shaft 140. The spacers 355 are assembled on the shaft 140 as necessary to maintain a proper alignment of the pivot arm 401. The torsion spring 360, wrapped about the spacers 355, exerts force against the frame 103 and the pivot arm 401. The pivot arm 401 is thus able to rotate on the shaft 140, but the force exerted by the torsion spring 360 biases the distal end 417 of the pivot arm 401 shown in FIG. 1, to a closed position in which the gripping elements 420 are urged toward the frame 103.

In the closed position, the pivot arm 401 has pivoted, such that the roller bearing 430 is on the posterior side P of the frame 103, with the pivot arm teeth 440 still on the anterior side A. The trigger foot 350 engages or rests in a valley between two of the pivot arm teeth 440, thereby preventing inadvertent upward rotation of the pivot arm 401. This effectively locks the pivot arm 401 in a closed position. When the object retrieval device 100 is suspended by the suspension means 165, with the pivot arm 401 in the cocked position, the trigger actuation means 200 partially blocks the frame opening 120 and the roller bearing 430 rests on the trigger foot 350.

Figure 7:
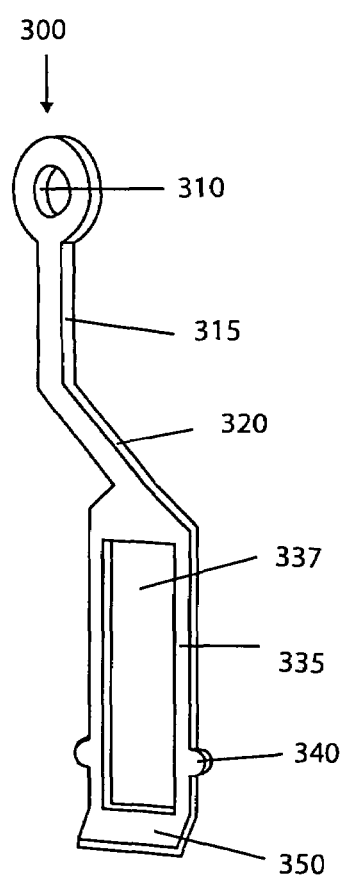
FIG. 7 illustrates the adjustable foot.

FIG. 7 shows a perspective view of an adjustable foot 500, which is particularly useful when using the object retrieval device 100 to retrieve objects from various types of ground surfaces. The foot 500 has a cantilevered support 510 perpendicular to a foot body 515. The foot body 515 has a stabilizer 530 and a foot retaining means 520. The adjustable foot 500 is slidably assembled in the posterior groove 115 at the bottom B of the frame 103 and is securely held in place by a spring force exerted by the foot retaining means 520 against the walls of the posterior grooves 115. The stabilizer 530 is an optional device that prevents lateral shifting of the foot 500 when the foot retaining means 520 is extended far up into the frame 103. The cantilevered support 510 extends away from the posterior side P of the frame 103. The height of the object retrieval device 100 may be adjusted by sliding the adjustable foot 500 up or down the posterior channel 107. The adjustable foot 500 allows the operator to adjust the distance between the retrieval means 400 and the ground surface. Depending on the object to be retrieved, it may be desirable to increase or decrease this distance. For example, if a bow were dropped, the string may be between one and four inches above the ground, depending on the rests and quiver attached to the bow riser. It is desirable to be able to increase the distance between the retrieval means and the ground, if the task is to scoop the bow string. A glove might land on top of litter and stay there, whereas an arrow might bury into the letter and come to rest closer to the ground. In these cases, too, it is desirable to adjust the distance of the retrieval means 400 to the ground surface, to enhance the gripping function by avoiding scooping up litter that would prevent the tips of the gripping elements 420 from gripping the object.

Operation of the object retrieval device 100: First the height of the object retrieval device 100 is adjusted by sliding the adjustable foot 500 up or down the posterior channel 107. The height may be adjusted to accommodate a layer of litter on the ground or to compensate for the size of the item to be captured. For example, the height of the object retrieval device 100 may be adjusted differently to capture a hat as oppossed to an arrow. The retrieval means 400 is then engaged. To accomplish this, the actuation means 200 is first deactivated by grasping the device 100 by the frame 103. Gravity causes the trigger 300 to move downward in the anterior channel 106 and the trigger foot 350 disengages from the pivot arm teeth 440. The pivot arm 401 is now lifted so that the distal end 417 rotates away from the frame 103. The proximal end 405 of the pivot arm 400 and its attached roller bearing 430 rotate through the pivot arm aperture 120 from the posterior side P to anterior side A. The trigger 300 is slid upwards until the trigger foot 350 partially blocks the pivot arm aperture 120 and is supporting the roller bearing 430. The upward pull of the suspension means 165 holds the trigger 300 and the pivot arm 400 in the cocked position. The operator positions himself so that he is directly above the object to be retrieved. For example, a hunter in a tree blind, who has dropped his hat to the ground, positions himself in the tree blind so that he is directly over the hat. The object retrieval device 100 is lowered via the suspension means 165 to the ground such that the object to be captured is positioned between the adjustable foot 500 and the gripping elements 420. Support of the object retrieval device 100 by the ground surface causes the suspension means 165 to slacken. Gravity forces the trigger 300 downward in the anterior channel 106, thereby unblocking the pivot arm aperture 120. The torsion spring 360 forces the pivot arm 401 to rotate downward and the roller bearing 430 to roll off the trigger 300 and to move to its biased closed position. The pivot arm 401 closes onto to the object and captures it between the gripping elements 420 and the frame 103. The operator then lifts the object retrieval device 100 and the captured object upwards via the suspension means 165. The upward lift causes the trigger 300 to slide upward in the anterior channel 106. The trigger foot 350 moves between the pivot arm teeth 440, thereby locking the pivot arm 401 in the closed position.

The height of the trigger foot 350 within the frame opening 120 is adjustable to some extent by increasing or decreasing the trigger offset 320. The relative height of the trigger foot 350 adjusts the ease with which the trigger 300 drops when the object retrieval device 100 contacts the ground surface. If the trigger foot 350 rides relatively low, a relatively lesser force, and conversely, if it rides relatively high, a relatively greater force is required to cause the trigger 300 to drop. When under load, contact between the trigger throat 315 and the trigger guide 201 transfers some of the weight of the object retrieved and suspended from the retrieval means 400 to the frame 103, away from the trigger foot 350, which is holding the pivot arm 401 in the locked position. This reduces the likelihood that the trigger foot 350 will bend under the weight of the load, which would change the alignment with the roller bearing 430. This same contact is important when lowering the object retrieval device 100 in the cocked position. The weight of the pivot arm 401 shifts outward as the object retrieval device 100 is lifted. This causes the frame 103 to tip forward away from its perpendicular position. The trigger offset 320 compensates for the weight shift and brings the frame 103 back to the vertical position.

It is understood that the embodiments described herein are merely illustrative of the present invention. Variations in the construction of the gravity actuated retrieval device may be contemplated by one skilled in the art, without limiting the intended scope of the invention herein disclosed and as defined by the following claims.

What is claimed is:

1. An object retrieval device comprising:
   a frame that is a single, slender member;
   a retrieval means that includes a single pivot arm having a proximal end and a distal end, and a mounting assembly for rotatably mounting said proximal end of said pivot arm in said frame;
   a suspension means for suspending said frame and retrieval means above an object to retrieve;
   an actuation means assembled in said frame, said actuation means including a gravity-actuated trigger for holding said pivot arm in a cocked position, wherein said trigger is held in a cocked trigger position as long as a tension force is applied to said suspension means and automatically triggers under force of gravity when said tension force is removed, thereby releasing said pivot arm from said cocked position and allowing said pivot arm to swing toward said frame;
   wherein said pivot arm and said frame are adapted to catch and hold said object to retrieve between said pivot arm and said frame.

2. The object retrieval device of claim 1, wherein said trigger is slidably mounted on said frame, wherein a catch means is provided on said proximal end of said pivot arm for holding said pivot arm in a cocked position on said trigger.

3. The object retrieval device of claim 2, wherein said trigger has a trigger body with a trigger edge and wherein said catch means includes a roller bearing that is restrainable by said trigger edge when said actuation means is in said cocked position.

4. The object retrieval device of claim 3, wherein said trigger body has a trigger foot that is angled relative to said trigger body toward an anterior side of said frame, wherein said catch means further includes a catch groove, and wherein a lower edge of said trigger foot is catchable in said catch groove so as to restrain said pivot arm in a closed position.

5. The object retrieval device of claim 2, wherein said frame has an anterior side with an anterior channel, wherein parallel and opposite vertical grooves are provided in said anterior channel, and wherein said trigger is slidably mounted in said grooves.

6. The object retrieval device of claim 5, wherein said frame has a posterior side with a posterior channel, wherein parallel and opposite vertical grooves are provided in said posterior channel, wherein said actuation means further includes a trigger guide with a cantilevered guide plate and a guide slot formed in said guide plate in which an upper end of said trigger is receivable, wherein said trigger guide is assemblable in said posterior grooves, such that said cantilevered guide plate extends toward said anterior side of said frame.

7. The object retrieval device of claim 2, wherein said trigger has an upper end with a means for receiving an end of said suspension means.

8. The object retrieval device of claim 2, wherein said frame has a frame opening in a center section of said frame, with a side frame on each side of said opening, and said mounting assembly is mounted in said frame opening, wherein said trigger has a trigger opening and said trigger is slidably mounted on said frame such that said trigger opening overlays said frame opening and said proximal end of said pivot arm extends through said trigger opening on an anterior side.

9. The object retrieval device of claim 8, wherein said mounting assembly includes a shaft that extends across said frame opening and through said side frame, wherein said proximal end of said pivot arm is rotatably mounted on said shaft such that said distal end of said pivot arm is positioned on said anterior side of said frame.

10. The object retrieval device of claim 9 further comprising a biasing means for biasing said distal end of said pivot arm toward said closed position.

11. The object retrieval device of claim 10, wherein said biasing means is a torsion spring that is assembled around said shaft, with one end of said spring exerting a force against said frame and another end exerting a force against said pivot arm.

12. The object retrieval device of claim 1 further comprising an adjustable toot that incorporated into a lower end of said frame.

13. The object retrieval device of claim 12, wherein said foot has a guide bar for maintaining proper alignment of said foot and lateral spring means for retaining said foot at a proper adjustment within said frame.

14. The object retrieval device of claim 1, wherein said pivot arm includes a gripping element for gripping said object to retrieve.

15. The object retrieval device of claim 14, wherein said gripping element includes two gripping protrusions with a recess therebetween.

16. The object retrieval device of claim 14, wherein a gripping element-receiving recess is provided in said frame for receiving a tip of said gripping element when said retrieval means is in said closed position.

17. The object retrieval device of claim 1, wherein said pivot arm has a curved contour for scooping said object to retrieve.

* * * * *